(12) United States Patent
Canning et al.

(10) Patent No.: US 12,328,406 B2
(45) Date of Patent: Jun. 10, 2025

(54) PRIVACY SCREEN PROTECTOR HAVING AN IMAGE AND A METHOD OF MAKING THEREOF

(71) Applicant: Screen Skinz, Inc., Lakeland, FL (US)

(72) Inventors: Clayton Canning, Lakeland, FL (US); RaShaun Brown, Houston, TX (US)

(73) Assignee: Screen Skinz, Inc., Lakeland, FL (US)

( * ) Notice: Subject to any disclaimer, the term of this patent is extended or adjusted under 35 U.S.C. 154(b) by 0 days.

(21) Appl. No.: 18/715,626

(22) PCT Filed: Oct. 2, 2023

(86) PCT No.: PCT/US2023/075709
§ 371 (c)(1),
(2) Date: May 31, 2024

(87) PCT Pub. No.: WO2024/073769
PCT Pub. Date: Apr. 4, 2024

(65) Prior Publication Data
US 2024/0414252 A1    Dec. 12, 2024

Related U.S. Application Data

(60) Provisional application No. 63/412,214, filed on Sep. 30, 2022.

(51) Int. Cl.
*G06F 21/84*    (2013.01)
*H04M 1/02*    (2006.01)
(Continued)

(52) U.S. Cl.
CPC .......... *H04M 1/0266* (2013.01); *G06F 21/84* (2013.01); *H04M 1/22* (2013.01); *B33Y 80/00* (2014.12); *B41M 3/148* (2013.01); *G02B 5/23* (2013.01)

(58) Field of Classification Search
CPC ....... H04M 1/0266; H04M 1/22; G06F 21/84; G06F 2203/04103; B33Y 80/00;
(Continued)

(56) References Cited

U.S. PATENT DOCUMENTS

2007/0024605 A1   2/2007   Motoe
2007/0095929 A1*   5/2007   Cote ................ G06K 19/06196
                                                       235/494
(Continued)

FOREIGN PATENT DOCUMENTS

CN       112965313 A    6/2021
WO    2016202065 A1   12/2016

OTHER PUBLICATIONS

Amegadze, et al.; "Development of high-performance printed polymer field-effect transistors for flexible display"; Journal of Information Display, 2014; vol. 15, No. 4; 18 pages.
(Continued)

*Primary Examiner* — Andrew L Swanson (57) ABSTRACT

The disclosure provides a screen protector that not only protects screens but also includes at least one image that is visible based on activation of a display area of a screen and a privacy filter. The privacy filter can be part of the screen protector. In one example, a method of making a privacy screen protector for a screen, includes: (1) adding at least one image to a surface of a substrate and (2) adding a privacy filter to the substrate that includes a viewing angle, wherein visibility of the at least one image is based on the viewing angle of the privacy filter and on activation of a display area of a screen onto which the screen protector is installed.

20 Claims, 8 Drawing Sheets

DISPLAY AREA OF SCREEN 304 THAT CORRESPONDS TO DASHED AREA OF GLASS SUBSTRATE 102 SHOWN IN FIG. 2

(51) Int. Cl.
*H04M 1/22* (2006.01)
*B33Y 80/00* (2015.01)
*B41M 3/14* (2006.01)
*G02B 5/23* (2006.01)

(58) Field of Classification Search
CPC .............. G09G 2320/068; G02B 5/203; G02B 2207/123; G02B 5/23; G02B 5/123; G02F 1/13338
See application file for complete search history.

(56) References Cited

U.S. PATENT DOCUMENTS

| | | | |
|---|---|---|---|
| 2012/0033304 A1* | 2/2012 | Kim ..................... | G02B 5/0278 |
| | | | 359/614 |
| 2016/0071448 A1* | 3/2016 | Schwarz ............... | G02F 1/1333 |
| | | | 349/83 |
| 2018/0129829 A1 | 5/2018 | Li | |
| 2018/0372922 A1 | 12/2018 | Kim et al. | |
| 2019/0241013 A1* | 8/2019 | Hyvönen ................ | B32B 7/06 |
| 2021/0223609 A1* | 7/2021 | Zhu .................... | G02F 1/133509 |
| 2023/0266514 A1* | 8/2023 | Gubser ................ | G02B 5/223 |
| | | | 252/582 |

OTHER PUBLICATIONS

Kang, et al.; "Efficient Transfer of Large-Area Graphene Films onto Rigid Substrates by Hot Pressing"; ACS Nano, Jun. 26, 2012; 6 pages.

\* cited by examiner

PRIVACY SCREEN PROTECTOR HAVING AN IMAGE AND A METHOD OF MAKING THEREOF

CROSS-REFERENCE TO RELATED APPLICATION

This application is the National Stage of, and therefore claims the benefit of, International Application No. PCT/US2023/075709 filed on Oct. 2, 2023, entitled "A PRIVACY SCREEN PROTECTOR HAVING AN IMAGE AND A METHOD OF MAKING THEREOF," which claims the benefit of U.S. Provisional Application Ser. No. 63/412,214, filed by Clayton Canning on Sep. 30, 2022, entitled "A GLASS SCREEN PROTECTOR HAVING AN IMAGE AND A PRIVACY SCREEN PROTECTOR HAVING AN IMAGE AND METHODS OF MAKING THESE SCREEN PROTECTORS," both which are commonly assigned with this application and incorporated herein by reference in their entirety.

TECHNICAL FIELD

This application is directed, in general, to screen protectors and, more specifically, to screen protectors having an image.

BACKGROUND

Computing systems or devices typically include a screen that is used to display information. The screens can be damaged that affects the presentation of the information. As such, screen protectors are often used to protect the screens. For example, screen protectors are commonly used with mobile computing devices, such as smart phones.

In addition to providing information, some screens are also capable of being a user interface that also receives information. Touch screens are an example of such a user interface.

BRIEF DESCRIPTION

Reference is now made to the following descriptions taken in conjunction with the accompanying drawings, in which.

DETAILED DESCRIPTION

The disclosure provides a screen protector that not only protects screens but also includes at least one image that is visible based on activation of a display area of a screen and a privacy filter. The image can be attached to a glass surface of the screen protector via one or more of a mechanical, chemical, or thermal process. The image can also be applied to a surface via a combination of at least two of a mechanical, chemical, or thermal process. All three of the different type of processes can be used. The mechanical process can include, for example, using a mold and cutting out an image (e.g., logo and/or design) to allow application of a material to a substrate surface, or simply substrate, that correctly defines the image. The chemical process can include, for example, applying the material to the substrate corresponding to the image via the mold. The material, can be a silver spray that is sprayed onto the substrate. The thermal process can include, for example, adhering the material to the substrate by heating the substrate. The substrate can be heated to, for example, 150 degrees or greater for the AG spray. The temperature can vary based on the material that is used. The glass surface can be a surface of a tempered glass substrate.

The image or images can also be engraved, such as via laser engraving, or etched into the substrate. The engraving or etching, as with the adhering, is performed to allow viewing of the image based on activation of a display area of the screen upon which the screen protector is applied and a privacy filter of the screen protector. The etching or engraving can be interval etching or engraving. The applied image can correspond to an interest, hobby, employer, location, person, etc. associated with a user of the screen. Accordingly, the disclosed screen protector allows a user to both personalize and protect a screen. The disclosed screen protector can protect the screen from physical damage and can also protect the screen from unwanted viewing.

Figure 1:
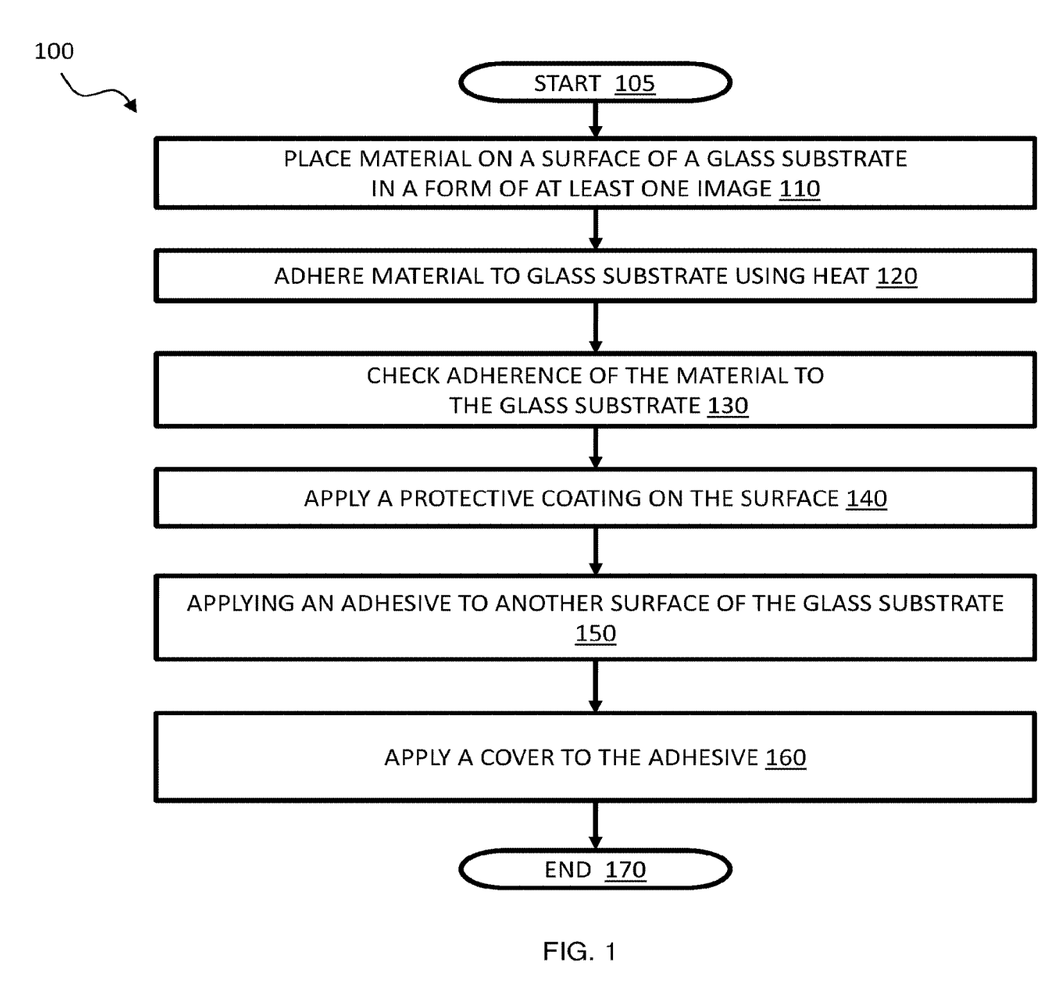
FIG. 1 illustrates a flow diagram of an example of a method of making a screen protector for a screen according to the principles of the disclosure.
Figure 8:
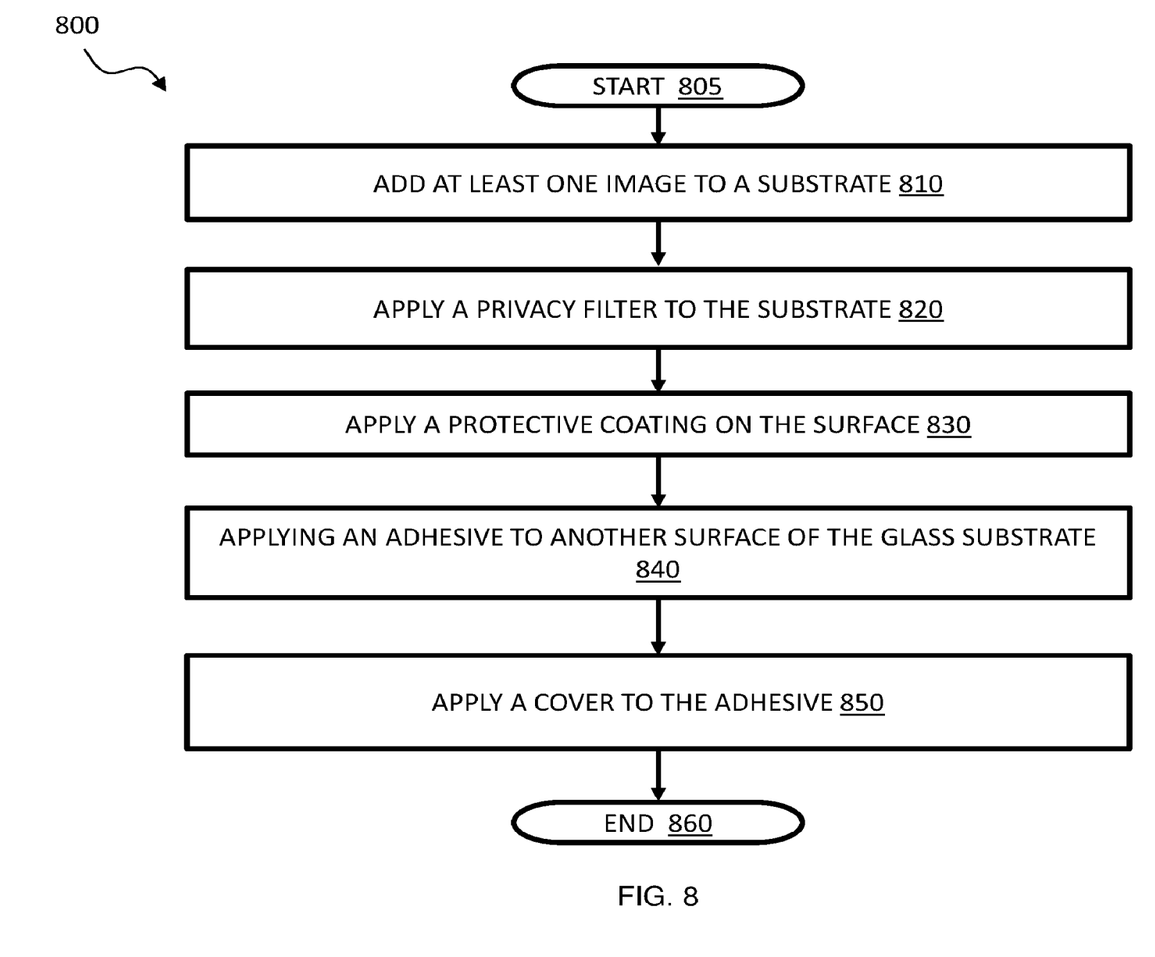
FIG. 8 illustrates a flow diagram of an example of a method of making a privacy screen protector for a screen according to the principles of the disclosure.

FIG. 1 illustrates a flow diagram of an example of a method 100 of making a screen protector for a screen according to the principles of the disclosure. The method 100 covers making the screen protector with an image and the method 800 covers making a privacy screen protector. The method 100 can be used with the method 800. Other methods of placing or engraving one or more images on a substrate can also be used with method 800. The method 100 begins in step 105.

In step 110, a material is placed on a surface of a glass substrate in a form of at least one image. The material can include one or more of gloss oil, powder, clear resin, paint, stain, varnish, wax, chroma, dye, enamel, or veneer. The material can be a chemical substance, for example, a chemical substance that includes silver gloss powder.

The material can be placed on the surface through one or more openings of a mold that correspond to the at least one image. The material can be sprayed, painted, or deposited in another way onto the surface through the one or more openings of the mold. The mold can be constructed of various products, such as cardboard, plastic, metal, film, or paper. The thickness of the mold can vary and can be based on the desired thickness of the material to be placed on the surface. The thickness of the mold can be in the range of 0.014 inches to 0.018 inches. In one example, the thickness is about 0.014 inches. In another example, the thickness of the mold is 0.016 inches or 0.018 inches.

The mold can be formed by manually or automatically cutting the one or more openings out of the product. For example, a user can manually cut out the one or more openings out of cardboard using a knife. The one or more openings can also be cut out using a laser, either automatically or manually. A machine can also be programmed to cut out the one or more openings. For example, a computer numerical control (CNC) machine can be programmed to cut out the opening to form the mold. Instead of cutting out openings corresponding to the image to form the mold, the mold can be formed using a 3D printer wherein the one or more openings are not printed, i.e., left open without deposited material. A mold can be used multiple times to form a material on the surface of multiple glass substrates. The height and width of the mold can correspond to the height and width of the screen that is to be protected by the screen protector.

The material can also be applied or dispensed to the surface without a mold. For example, a machine or device can be programmed to apply the material on the surface in the desired image. The material can sprayed onto the surface in the image or can be deposited on the surface in the image. As such, a computer controlled sprayer or a 3D printer, for example, can be used to apply the material to the surface.

The material can also be deposited using a stamp wherein the image is recessed into the stamp, e.g., opposite of a rubber stamp. Custom designs can also be created by painting the surface with the material. Accordingly, unique screen protectors can be created for users.

In step 120, the material is adhered to the glass substrate using heat. As such, heat can be applied to the material to adhere the material to the glass substrate. The temperature of the heat that is applied can be in a range of 150 to 180 degrees Celsius. The amount of time for applying the heat can be in a range of thirty minutes to seventy five minutes. In one example, the amount of time for applying the heat is in a range of thirty minutes to fifty minutes. The heat can be applied via an oven. The temperature and the amount of time can be based on historical data and can also be based on the type of material. Multiple glass substrates can be placed in the oven for the adhering process. Accordingly, the method 100 can be a manufacturing method for producing multiple screen protectors.

When a mold is used, the mold can be removed before the heat is applied. The mold can be removed after the material is set or solidified. The amount of time to set or solidify is based at least on the thickness of the material and the type of material. The amount of time for setting can be after at least two minutes once the material is applied to the surface. In some examples, 3 to 5 minutes.

The mold can also be left in place during the heating. For example, the mold may be constructed of a heat resistant material that allows the mold to remain in place during the application of heat. The mold can then be removed after the heating.

In some examples, the mold can be created out of a material that disintegrates or can be washed away after the application of the heat. As such, the mold may stay in place on the substrate during the heating process and be at least partially removed due to the heat. The mold may be constructed of a film or another product that is partially or totally removed due to the application of the heat.

In step 130, adherence of the material to the surface of the glass substrate is checked in step 130. The glass substrate can be washed after the heating process to assist in determining the material adhered to the glass substrate. Various mixtures can be used to wash the glass substrate. The washing can also remove any remaining portion of a mold if used, such as a mold that was partially removed during the heating. The mold may also be physically removed before washing, such as when a heat resistant mold is used. Determining adherence can be performed manually.

A coating is applied on the surface in step 140. The coating can be a protecting coating to protect the material, i.e., image, which is adhered to the glass substrate. The coating can be a standard coating that is used is used in the industry to protect against fingerprints. The coating can be a PolyEthylene Terephthalate (PET) coating or film that is applied.

In step 150, an adhesive is applied to another surface of the glass substrate. The surface having the adhered material is a top surface of the glass substrate and the adhesive is applied to the opposite side of the top surface, wherein the opposite side is the screen side of the glass substrate.

In step 160, a cover is applied to the adhesive. The cover protects the adhesive until removed when placing the screen protector on the screen to protect. Steps 140, 150 and 160 and the materials that are used for each of these steps can be steps and materials that are common in the industry.

In step 170 the method 100 ends. The above description represents a method for manufacturing a single screen protector. One skilled in the art will understand that the method can be scaled for the mass production of screen protectors.

The disclosure, therefore, provides screen protectors (e.g., tempered glass screen protectors) having an image adhered thereon, wherein the image is visible when a backlight of a screen that the screen protector is installed on is not activated (not illuminated) and the image becomes transparent and/or translucent when the backlight of the screen that the screen protector is installed on is activated (illuminated). As noted herein, viewing of the image can also be controlled by a privacy filter. The privacy filter can be a conventional privacy filter, such as a film that is added to the substrate or an application (e.g., a mobile app) that operates on the computing device (e.g., smart phone).

Figure 2:
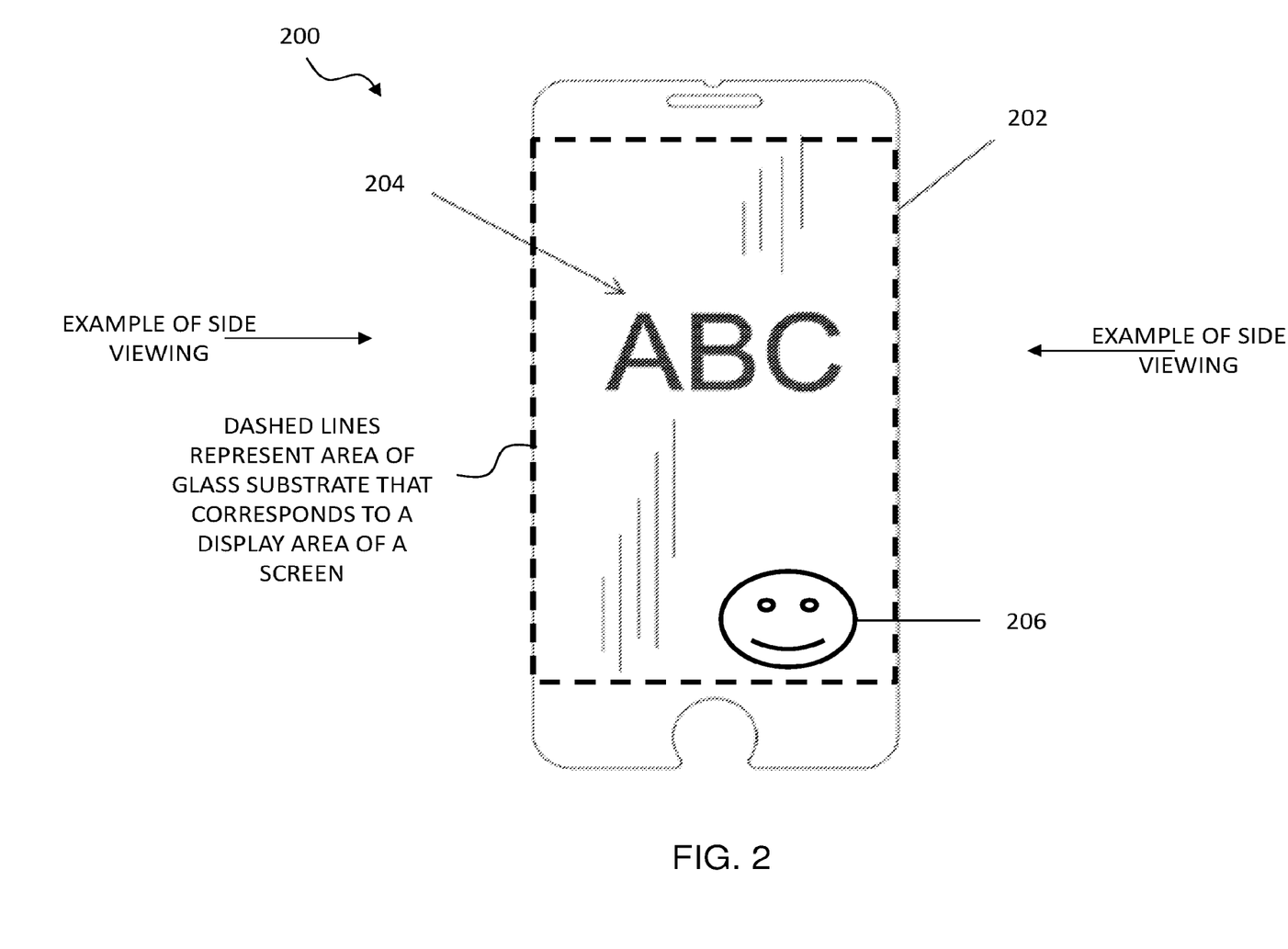
FIG. 2 illustrates a diagram of an example screen protector, with at least one image, constructed according to the principles of the disclosure.

FIG. 2 illustrates a diagram of an example screen protector 200 constructed according to the principles of the disclosure. The screen protector 200 includes a glass substrate 202 (e.g., tempered glass) and an image 204 that is adhered to a top surface of the glass substrate 202. The top surface can be a surface of the glass substrate 202 that is facing away from a screen when the glass substrate 202 is installed on the screen for protection. In other words, the top surface is the surface of the glass substrate 202 that is not in contact with the screen. The image 204 can include graphical images, letters, numbers, symbols, etc. In general, image 204 can include any graphical image and/or alphanumeric image.

The screen protector 200 can include more than one image and the multiple images may be placed on top of the surface during different processes. For example, image 204 can be adhered to the glass substrate 202 using method 100 and an additional image, represented by image 206 in FIG. 2 as an example, can be added to the top of the glass substrate 202 by using method 100 a second time. Of course, multiple images can be adhered to the top of the glass substrate using method 100 a single time. As such, distinct images can be referred to as a single image when adhered to the glass substrate 202 in a single adhering process, such as method 100. Images can be added to the glass substrate 202 using different processes. For example, image 204 can be added using method 100 and another image can be added using an engraving or etching method. As such, engraved or etched images can be added to the glass substrate 202 (either on the top surface or the opposite surface that will go on the screen to protect) and then image 204 can be adhered to the glass substrate 202. Accordingly, screen protectors having, for example, etched or engraved images can be further customized by adhering an image to the glass substrate 202. Image 204 could also be added first before adding other images to the glass substrate 202 using a different type of process. A combination of different processes can be used to add image 204 and other images.

The image 204 is adhered to the top surface of the glass substrate 202 using at least one of a mechanical, chemical, or thermal process. At least two of the aforementioned processes can be used. For instance, a material can be sprayed onto the glass substrate 202 (mechanical process) and then adhered to the glass substrate 202 using heat (thermal process). All three of the processes can occur. For example, a chemical reaction can occur with the material used to form image 204 when heated that results in the material adhering to the glass substrate 202.

Figure 7:
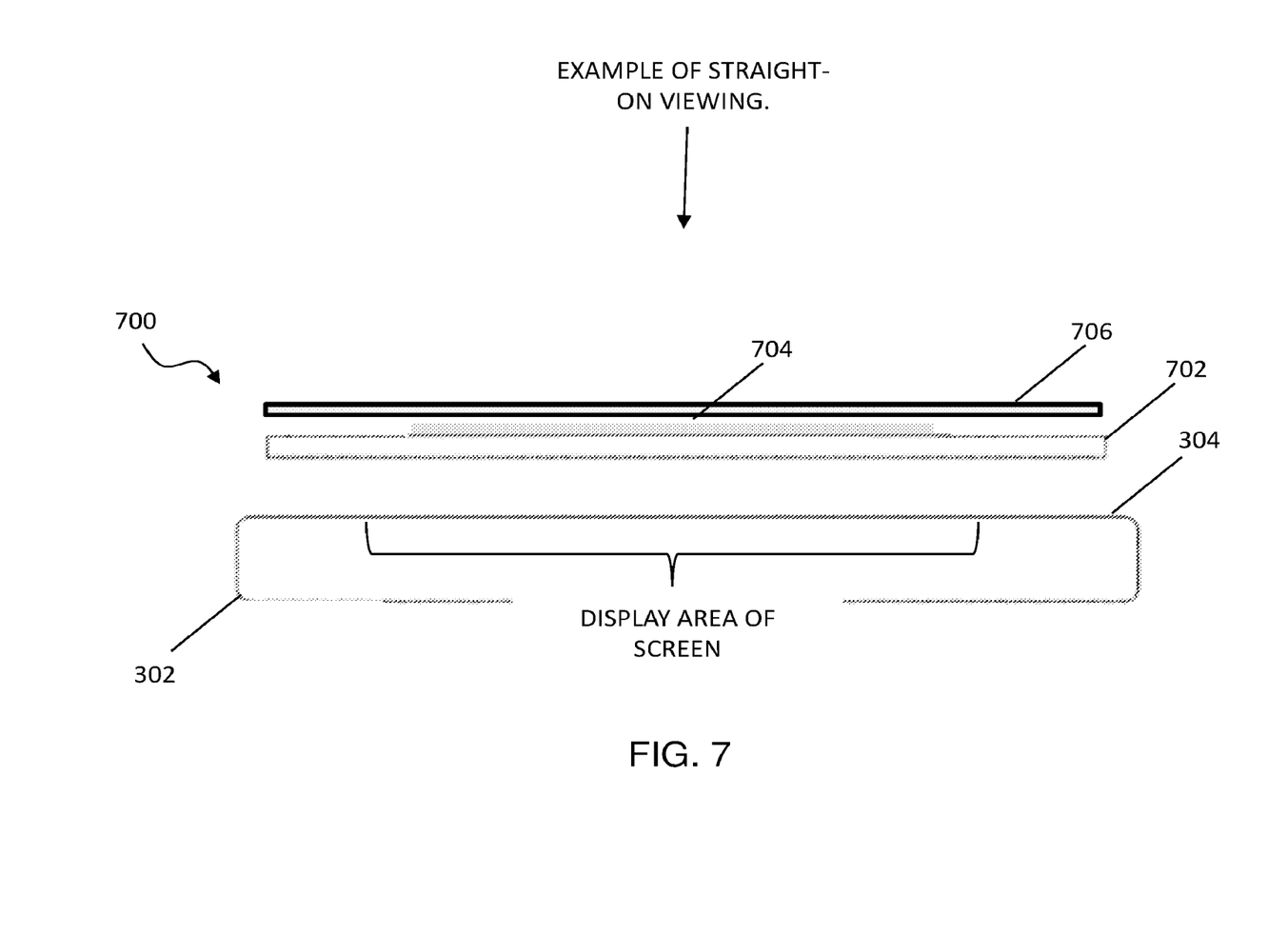
FIG. 7 illustrates a diagram of a side view of a privacy screen protector being installed on the screen of a device in accordance with principles of the disclosure.

As noted in FIG. 2, image 204 is positioned within an area that corresponds to a display area of a screen to protect. When the display area of the screen onto which the screen protector 200 is installed is not activated, image 204 is visible. Additionally, when the display area is activated, image 204 can be invisible. Visibility or invisibility of image 204 when the display is activated can be based on an angle of viewing the screen. For example, the screen protector 200 may be a privacy screen protector that protects or shields content on the screen, such as in the display area, from others except for the user. As such, the screen protector 200 can include an additional layer that is a privacy layer or filter layer (referred to hereinafter as a privacy filter) that prevents or at least greatly limits viewing the screen except when looking straight-on or within a desired viewing angle, collectively referred to as a viewing volume. For example, the privacy filter can limit the viewing angle to approximately 30 degrees on either side of a screen. With the privacy filter, image 204 can always be visible at a certain viewing angle or angles, such as from the sides of the screen having a viewing angle greater than 30 degrees, even when the display area of the screen is illuminated. Thus, with screens that may always be illuminated or illuminated for a great deal of time, such as always on screens available with some smart phones, image 204 would not be visible for direct or straight-on viewing but would be visible at viewing angles that correspond to the non-viewing angles determined by the privacy filter. FIG. 7 illustrates an example of a privacy screen protector and FIG. 8 illustrates a method of manufacturing one or more privacy screen protectors.

Figure 3:
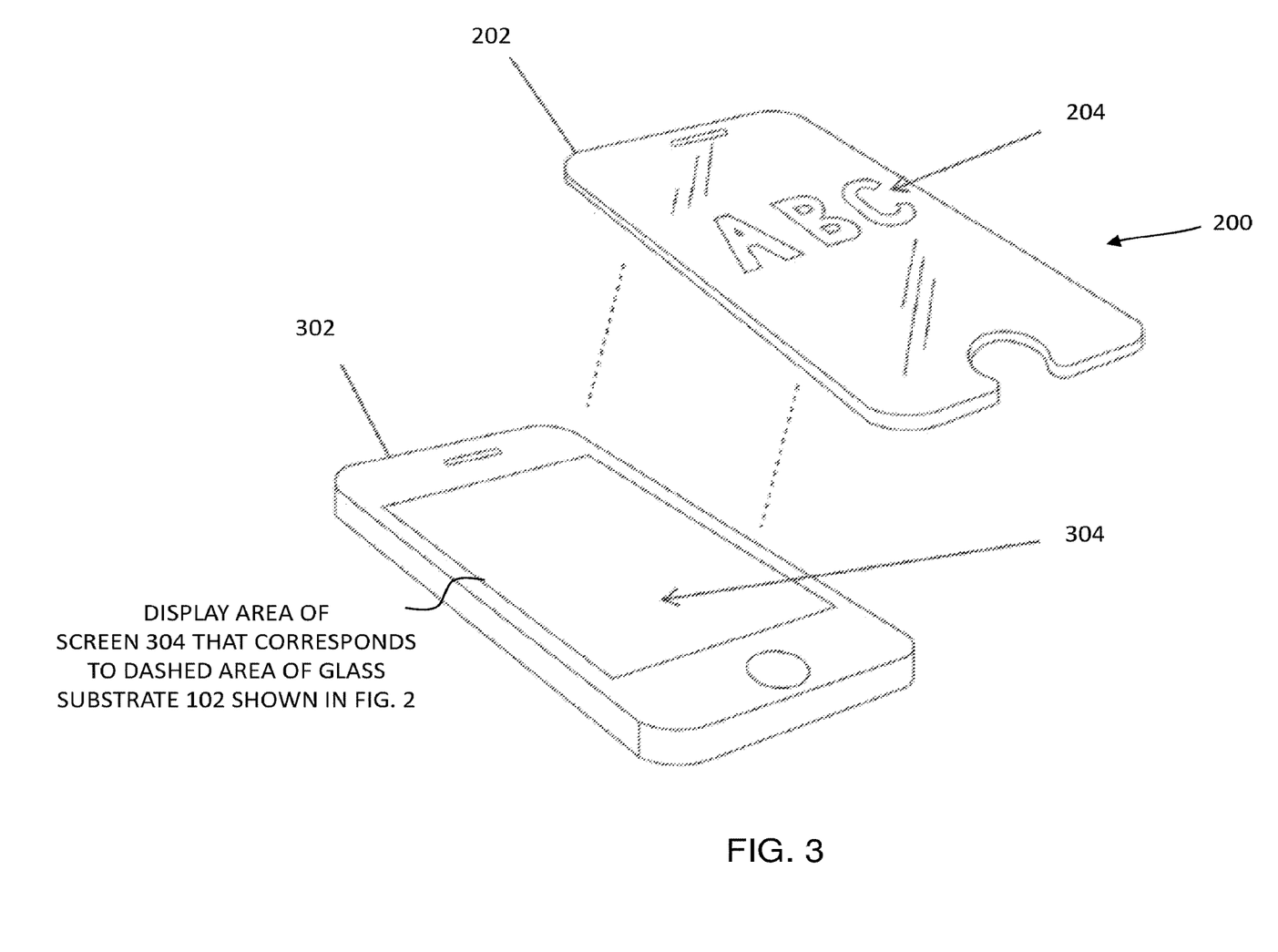
FIG. 3 illustrates a diagram of the screen protector of FIG. 2 being installed on a screen of a device.

FIG. 3 illustrates a diagram of example screen protector 200, with image 204, being installed on a screen of a device 302. The screen protector 200, with glass substrate 202 and the image 204, is shown in a process being installed onto a screen 304 of device 302. In FIG. 3, the device 302 is a smart phone. The smart phone can include components typically included with a smart phone or other computing device, such as one or more processors and one or more memories. The one or more processors and the one or more memories can cooperate to operate applications, such as mobile apps, on the smart phone. One such mobile app can be a privacy filter that cooperates with the screen protector 200 to control viewing of content on the screen 304 and of the image 204.

Similar screen protectors constructed as screen protector 200 can be installed on other devices, such as mobile phones, tablet computers, laptop computers, flat screen monitors, flat screen televisions, etc., to protect the screens thereof. A screen protector can also be made according to the principles of the disclosure for a watch face (e.g., mechanical, electronic or computerized watches or wearable devices), display screens on buildings, windows, appliances, furniture, product displays, etc. An implementation can be made for a vehicle light (e.g., a headlight, a tail light, a fog light, etc.). An implementation can be made for a vehicle window, a vehicle windshield, or a vehicle interior display screen. In general, the glass substrate 202 with image 204 can be installed on any backlit display or non-backlit (e.g., OLED) display screen. The screens and the display areas of the screens for the different type of devices can vary. As such, the size and shape of the screen protectors can also vary to correspond to the screens and/or display areas of the screens for the different devices. In some devices, the display area of a screen and the area of the screen are the same. As with screen protector 200, the screen protectors for these other devices can also include a privacy filter.

Figure 4:
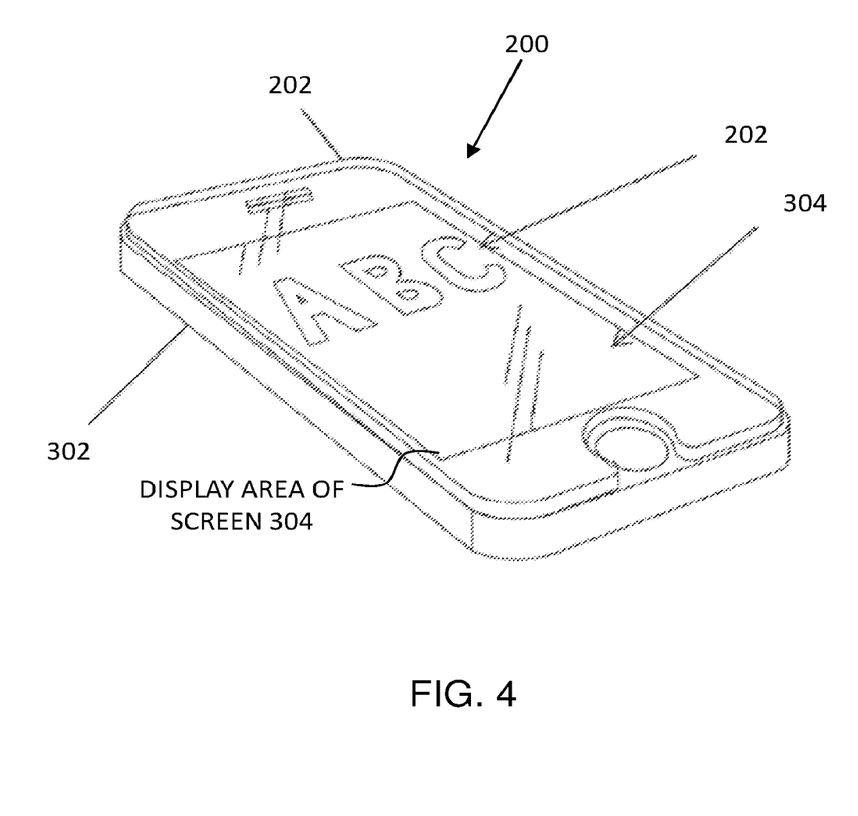
FIG. 4 illustrates a diagram the screen protector of FIG. 2 installed on the screen of the device of FIG. 3.
Figure 5:
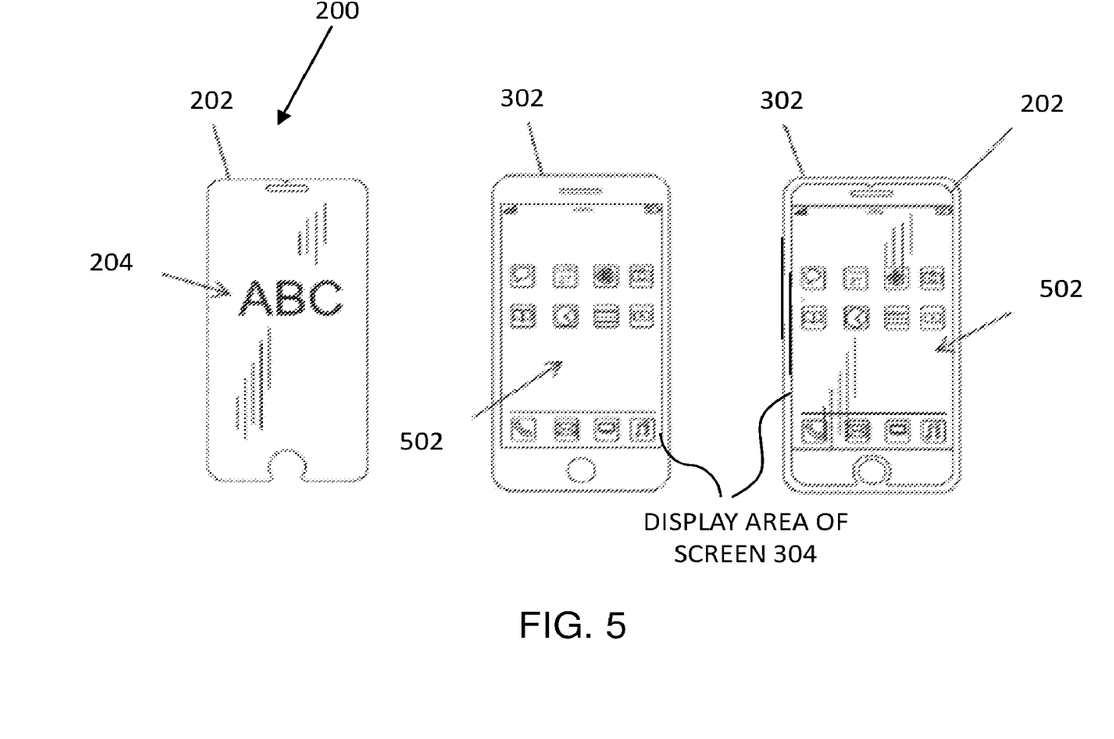
FIG. 5 illustrates the screen protector of FIG. 2 on the left, the device of FIG. 3 in the middle without the screen protector and with the screen illuminated, and the device on the right with the screen protector and the screen illuminated.

FIG. 4 illustrates a diagram of screen protector 200 installed on the screen 304 of the device 302 in accordance with the principles of the disclosure. In FIG. 4, the display area of the screen 304 is not illuminated and the image 202 is visible. FIG. 5 illustrates an example when the display area or screen 304 is illuminated and the image 202 is not visible.

FIG. 5 illustrates the screen protector 200 on the left, device 302 in the middle without the screen protector 200 and with screen 304 illuminated, and device 302 on the right with the screen protector 200 and an illuminated screen 304. For illumination, a light (e.g., backlight or internal light source) of screen 304 has been activated and the image 204 is no longer visible because the image 204 becomes translucent and/or transparent when a light source of the screen 304 is activated and a screen image 502 displayed on the screen 304 of device 302 becomes visible. With the screen protector having a privacy filter, the image 204 would be visible from the side, even when illuminated, outside of the desired viewing angle corresponding to the privacy filter. The side viewing shown in FIG. 2 provides an example.

Figure 6:
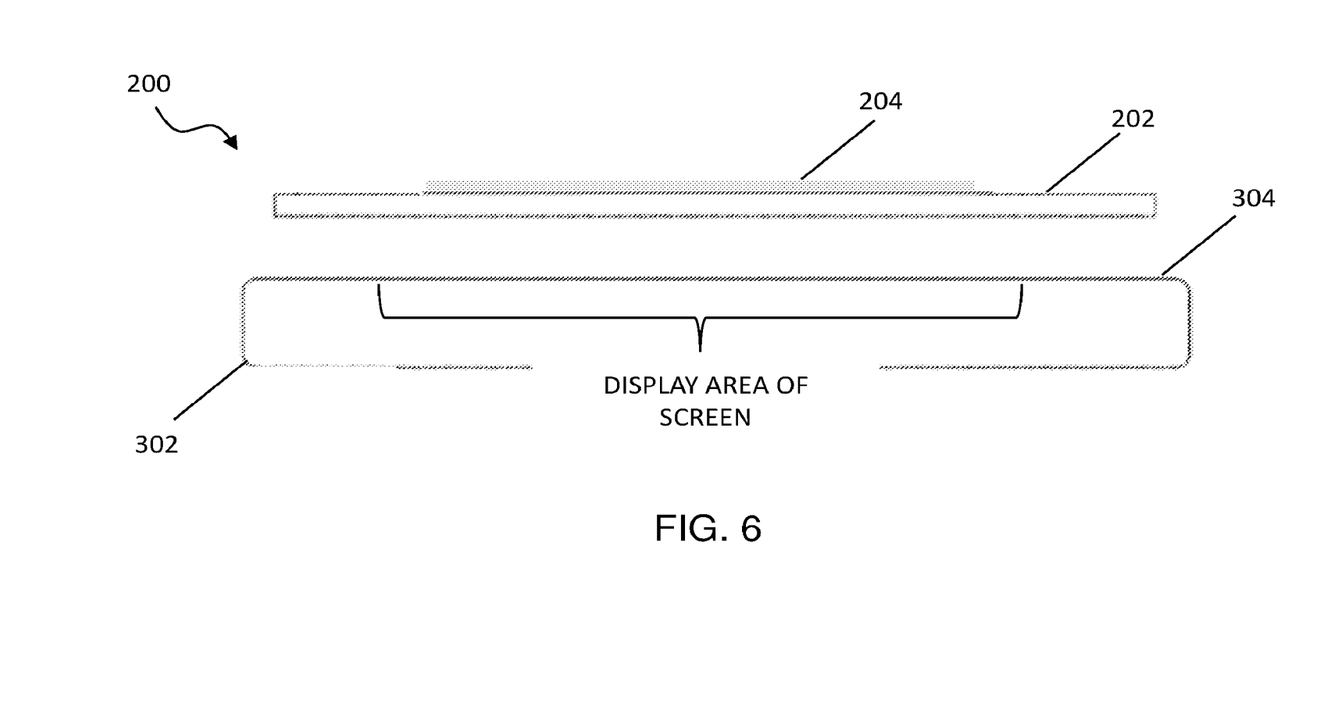
FIG. 6 illustrates a diagram of a side view of the screen protector of FIG. 2 being installed on the screen of the device of FIG. 3 in accordance with principles of the disclosure.

FIG. 6 illustrates a diagram of a side view of screen protector 200 with image 204 being installed on screen 304 of device 302 in accordance with principles of the disclosure. Image 204 is shown on the top surface of glass substrate 202. FIG. 6 shows the screen protector 200 without a privacy filter. FIG. 7 illustrates a side view of a screen protector, such as screen protector 200, which shows a privacy filter.

FIG. 7 illustrates a diagram of a side view of screen protector 700 being installed on screen 304 of device 302 in accordance with principles of the disclosure. Screen protector 700 includes substrate 702 and image 704. The substrate 702 can be a glass substrate, such as glass substrate 202, and image 704 can be adhered thereto according to method 100, such as image 204. The substrate 702 can also be constructed of another material, such as plastic, and the image 704 can be applied/attached to the substrate 702 by engraving, etching, or another means. Image 704 is also shown on the top surface of substrate 702 but could be on the bottom surface of substrate via engraving, etching, etc. The substrate 702 can include one or more other images in addition to image 704 as discussed above with respect to FIG. 2.

Screen protector 700 is a privacy screen protector. As such, screen protector 700 also includes a privacy filter 706 that limits viewing of content of the screen 304 to straight-on viewing (or within a desired viewing angle). The privacy filter 706 can be an additional layer that is added to the substrate 702. The privacy filter 706 can be a conventional privacy layer that is used in the industry and can be applied as a film using conventional means. The privacy filter 706 can allow the image 704 to be always visible at the angles of 180 degrees and 360 degrees at a transparency rate of 56%-60%. The privacy filter 706 can limit the viewing angles on the screen 304, and only allow content displayed on the screen 307 to be visible head-on and not visible from the sides of the screen 304 when viewing at an angle that is not within a designated viewing angle dictated by the privacy filter 706. When looking from a side view outside of the designated viewing angle, only the image 704 inscribed within or on the substrate 702 may be visible. When looking straight-on the image 704 is not visible to the user when the screen 307 is illuminated but is visible when the screen 307 is not illuminated.

FIG. 8 illustrates a flow diagram of an example of a method 800 of making a privacy screen protector for a screen according to the principles of the disclosure. The method 800 begins in step 805.

In step 810, at least one image is added to a substrate. The image can be added according to the method 100. The image can also be added via, etching, engraving, such as laser engraving, or via another process. The substrate can be glass, such as tempered glass, or another material such as plastic. The image can be within the substrate, such as etched/engraved into one of the surfaces, or on top of a surface of the substrate.

Other examples of adding the image include scoring, etching, engraving, the image on a glass substrate, filling the image with a plasma chemical corrosion spray, such as a silver spray, and then heating the glass substrate to, for example, at least 180 degree Celsius.

In step 820, a privacy filter is added to the substrate. The privacy filter can be a polarized film or layer that is added via a conventional process or processes. The privacy filter can be a plastic, such as a PET film that is shaded at different angels to control viewing angles. The privacy filter can be added to the top or bottom surface. Adding of the privacy filter can occur after the at least one image is added. In other examples, adding of the privacy filter can occur before the image is added. For example, the privacy filter can be added to the top surface and the image can be engraved or etched into the substrate through the privacy filter. The privacy filter can also be added to the bottom surface and the image can then be added to the top surface of the substrate.

A coating is applied on the surface in step 830. The coating can be a protection coating to protect the material, i.e., image, which is adhered to the glass substrate. The coating can be a standard coating that is used in used in the industry to protect against fingerprints, such as in step 140.

In step 840, an adhesive is applied to another surface of the glass substrate. The surface having the privacy filter is on the top surface and the adhesive is applied to the opposite side of the top surface, wherein the opposite side is the screen side of the glass substrate.

In step 850, a cover is applied to the adhesive. The cover protects the adhesive until removed when placing the screen protector on the screen to protect. Steps 820, 830, 840, and 850 and the materials that are used for each of these steps can be steps and materials that are common in the industry. Additionally, the steps of the method 800 can be performed in a different order.

In step 860 the method 800 ends. The above description represents a method for manufacturing a single screen protector. One skilled in the art will understand that the method can be scaled for the mass production of screen protectors.

Those skilled in the art to which this application relates will appreciate that other and further additions, deletions, substitutions and modifications may be made to the described embodiments. Configured or configured to means, for example, designed, constructed, or programmed, with the necessary logic and/or features for performing a task or tasks.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

Various aspects of the disclosure can be claimed including the apparatuses and methods as disclosed herein. Aspects disclosed herein include:

A. A method of making a privacy screen protector for a screen, including: (1) adding at least one image to a surface of a substrate and (2) adding a privacy filter to the substrate that includes a viewing angle, wherein visibility of the at least one image is based on the viewing angle of the privacy filter and on activation of a display area of a screen onto which the screen protector is installed.

B. A privacy screen protector for a screen, including: (1) a substrate having an image and (2) a privacy filter having a viewing angle that prevents viewing of content displayed on the screen that is not within the viewing angle and simultaneously allows viewing of the image at viewing angles that is not at or within the designated viewing angle, wherein viewing of the content is further based on activation of the screen.

C. A computing device, comprising: (1) a screen configured to display content, and (2) a privacy screen protector including a substrate having an image and a privacy filter having a viewing angle that prevents viewing of the content displayed on the screen that is not within the viewing angle and simultaneously allows viewing of the image at viewing angles that is not at or within the designated viewing angle, wherein viewing of the content is further based on activation of the screen.

D. A smart phone, including: (1) a screen configured to display content, (2) one or more processors to perform operations, wherein the operations include providing a privacy filter for the screen that prevents viewing of the content displayed on the screen that is not within a designated viewing angle, and (3) a screen protector including a substrate having an image, wherein the screen protector allows viewing of the image at viewing angles that are not at or within the designated viewing angle when the content is displayed on the screen.

Each of the aspects A, B, C, and D can include one or more of the features included in the below dependent claims in combination.

What is claimed is:

1. A method of making a privacy screen protector for a screen, comprising:
adding at least one image to a surface of a glass substrate; and
adding a privacy filter to the substrate that includes a viewing angle, wherein visibility of the at least one image is based on the viewing angle of the privacy filter and on activation of a display area of a screen onto which the screen protector is installed, wherein the adding includes placing a material on the surface in a form of the at least one image and adhering the material to the surface using heat.

2. The method as recited in claim 1, wherein during the activation the image is visible outside of the viewing angle and the privacy filter limits side viewing of content on the screen to the viewing angle.

3. The method as recited in claim 1, wherein the placing includes applying the material on the surface through one or more openings of a mold that correspond to the at least one image.

4. The method as recited in claim 3, further comprising creating the mold by cutting the one or more openings out of the mold.

5. The method as recited in claim 4, wherein the one or more openings are cut out of the mold using a laser or using a computer numerical control (CNC) machine.

6. The method as recited in claim 3, further comprising forming the mold using a 3D printer.

7. The method as recited in claim 3, wherein the adhering includes applying the heat to the mold and the material, wherein the mold is constructed of a heat resistant material and the mold is at least partially removed due to the heat.

8. The method as recited in claim 1, wherein the placing includes dispensing the material to form the at least one image.

9. The method as recited in claim 8, wherein the dispensing is performed by a sprayer or a 3D printer.

10. The method as recited in claim 1, wherein the material includes one or more of gloss oil, powder, clear resin, paint, stain, varnish, wax, chroma, dye, enamel, or veneer.

11. The method as recited in claim 1, wherein the material includes silver gloss powder.

12. The method as recited in claim 1, wherein a temperature of the heat is in a range of 150 to 180 degrees Celsius.

13. The method as recited in claim 1, wherein the glass substrate is a tempered glass substrate.

14. The method as recited in claim 1, wherein the adding includes adding the image within an area of the substrate that coincides with the display area of the screen.

15. The method as recited in claim 1, wherein when the display area of the screen onto which the screen protector is installed is not activated, the image on the substrate is visible straight-on, within the viewing angle, and outside of the viewing angle.

16. The method as recited in claim 15, wherein when the display area of the screen onto which the screen protector is installed is activated, the image on the substrate is visible outside of the viewing angle and is not visible straight-on and within the viewing angle.

17. The method as recited in claim 16, wherein the screen is a screen of a mobile computing device.

18. The method as recited in claim 17, wherein the mobile computing device is a smart phone.

19. The method as recited in claim 1, wherein the privacy filter is placed on the surface on top of the added image.

20. The method as recited in claim 1, wherein the method is an additive manufacturing method that uses a combination of at least two of mechanical, chemical, and thermal processes.

* * * * *